United States Patent
Hatanaka

(10) Patent No.: US 11,667,761 B2
(45) Date of Patent: Jun. 6, 2023

(54) ETHYLENE-VINYL ALCOHOL COPOLYMER COMPOSITION PELLET AND PROCESS FOR PRODUCING SAID ETHYLENE-VINYL ALCOHOL COPOLYMER COMPOSITION PELLET

(71) Applicant: MITSUBISHI CHEMICAL CORPORATION, Tokyo (JP)

(72) Inventor: Makoto Hatanaka, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/064,670

(22) PCT Filed: Dec. 12, 2016

(86) PCT No.: PCT/JP2016/086926
§ 371 (c)(1),
(2) Date: Jun. 21, 2018

(87) PCT Pub. No.: WO2017/110561
PCT Pub. Date: Jun. 29, 2017

(65) Prior Publication Data
US 2019/0010296 A1    Jan. 10, 2019

(30) Foreign Application Priority Data
Dec. 24, 2015  (JP) .............................. JP2015-251832

(51) Int. Cl.
| | |
|---|---|
| C08J 3/12 | (2006.01) |
| C08L 29/04 | (2006.01) |
| C08L 77/02 | (2006.01) |
| C08K 13/02 | (2006.01) |
| B29B 9/12 | (2006.01) |
| B29B 7/00 | (2006.01) |
| C08K 5/00 | (2006.01) |
| C08L 23/08 | (2006.01) |
| B29B 7/42 | (2006.01) |
| B29B 9/06 | (2006.01) |
| B29B 7/46 | (2006.01) |
| B29B 9/16 | (2006.01) |

(52) U.S. Cl.
CPC .............. *C08J 3/12* (2013.01); *B29B 7/007* (2013.01); *B29B 9/12* (2013.01); *C08K 5/005* (2013.01); *C08K 13/02* (2013.01); *C08L 23/0846* (2013.01); *C08L 29/04* (2013.01); *C08L 77/02* (2013.01); *B29B 7/42* (2013.01); *B29B 7/46* (2013.01); *B29B 9/06* (2013.01); *B29B 2009/163* (2013.01); *C08J 2323/08* (2013.01); *C08J 2329/04* (2013.01); *C08J 2477/02* (2013.01)

(58) Field of Classification Search
CPC ...... C08J 3/12; C08J 2323/08; C08J 2329/04; C08J 2477/02; C08K 5/005; C08K 13/02; C08L 23/0846; C08L 29/04; C08L 77/02; B29B 7/007; B29B 7/42; B29B 7/46; B29B 9/12; B29B 2009/163
See application file for complete search history.

(56) References Cited

U.S. PATENT DOCUMENTS

| | | | | |
|---|---|---|---|---|
| 6,294,602 | B1 * | 9/2001 | Shimo ................... | B65D 35/02 428/474.4 |
| 6,565,938 | B1 * | 5/2003 | Toyosumi ............... | B32B 27/08 428/36.6 |
| 2005/0009987 | A1 | 1/2005 | Hara et al. | |
| 2005/0032955 | A1 * | 2/2005 | Nakano ................... | C08L 29/04 524/394 |
| 2007/0282043 | A1 * | 12/2007 | Shimomura ......... | B41J 2/17553 347/85 |
| 2009/0018299 | A1 * | 1/2009 | Tasaki .................... | B32B 27/32 526/348 |
| 2011/0135950 | A1 | 6/2011 | Okamoto et al. | |
| 2012/0252943 | A1 * | 10/2012 | Kimura ................. | C08K 5/527 524/108 |
| 2016/0215116 | A1 | 7/2016 | Kani | |
| 2017/0267851 | A1 | 9/2017 | Yamakoshi et al. | |

FOREIGN PATENT DOCUMENTS

| | | |
|---|---|---|
| EP | 2692780 A1 | 2/2014 |
| JP | 06345919 A * | 12/1994 |
| JP | H06-345919 A | 12/1994 |
| JP | 2001-200123 A | 7/2001 |
| JP | 2001200123 A * | 7/2001 |
| JP | 2002-210887 A | 7/2002 |
| JP | 2002-338771 A | 11/2002 |
| JP | 2003-276021 A | 9/2003 |
| JP | 2010-59418 A | 3/2010 |
| JP | 2012-036341 A | 2/2012 |
| JP | 2015-110734 A | 6/2015 |
| WO | 2015/174396 A1 | 11/2015 |

OTHER PUBLICATIONS

Heat Stabilizers, Plastics Additives & Compounding Aug. / Sep. 1999. (Year: 1999).*
English Machine Translation of JPH06345919 (JP-06345919) prepared Oct. 19, 2020. (Year: 2020).*
English Translation of JPH06-345919A, prepared Nov. 2020. (Year: 2020).*
English Translation of JP2001200123, prepared Aug. 2021. (Year: 2021).*

(Continued)

Primary Examiner — Christopher M Rodd
(74) Attorney, Agent, or Firm — Greenblum & Bernstein, P.L.C.

(57) ABSTRACT

The present invention provides ethylene-vinyl alcohol copolymer composition pellet reduced in coloration. The ethylene-vinyl alcohol copolymer composition pellet of the invention include an ethylene-vinyl alcohol copolymer (A), a polyamide resin (B), and an alkaline earth metal salt (C) and have a yellowness index (YI) value of 10 or less when examined with a spectral color-difference meter by a transmission method.

16 Claims, No Drawings

(56) References Cited

OTHER PUBLICATIONS

Extended European Search Report dated Jul. 17, 2019 in European Application No. 16878452.8.
International Search Report issued with respect to Patent Application No. PCT/JP2016/086926, dated Mar. 7, 2017.
International Preliminary Report on Patentability issued with respect to Patent Application No. PCT/JP2016/086926, dated Jun. 26, 2018.
Office Action issued in Taiwanese patent application No. 105142179 dated Mar. 25, 2020. English translation.
Office Action issued in European patent application No. 16878452.8 dated Apr. 29, 2020, English translation.
Office Action issued in CN patent Application No. 201680075755.5, dated Aug. 21, 2020, English translation.
Office Action issued in JP patent Application No. 2016-574203, dated Aug. 25, 2020, English translation.
TW Office Action issued in TW Patent Application 105142179,, dated Jan. 25, 2021, English translation.
Office Action issued in JP Patent Application 2016-574203, dated May 25, 2021, English translation.
Rejection Decision, Taiwanese Patent Application No. 105142179, dated Sep. 29, 2021, English translation.
Notification of Examination Opinions issued in corresponding Taiwanese Patent Application No. 105142179, dated Jan. 7, 2023, along with English translation thereof.

* cited by examiner

ETHYLENE-VINYL ALCOHOL COPOLYMER COMPOSITION PELLET AND PROCESS FOR PRODUCING SAID ETHYLENE-VINYL ALCOHOL COPOLYMER COMPOSITION PELLET

TECHNICAL FIELD

The present invention relates to ethylene-vinyl alcohol copolymer composition pellet reduced in coloration and a process for producing the ethylene-vinyl alcohol copolymer composition pellet.

BACKGROUND ART

Ethylene-vinyl alcohol copolymers (hereinafter often referred to as "EVOH resins") have a structure which renders the copolymer molecules apt to align, and have exceedingly high intermolecular force due to the hydrogen bonding between hydroxyl groups present in polymer side chains. EVOH resins are hence highly crystalline, and even the amorphous portions thereof have high intermolecular force. Molecules of gases including oxygen are hence less apt to permeate EVOH resins. Consequently, films and the like obtained from EVOH resins show excellent gas barrier properties.

Owing to the excellent gas barrier properties, EVOH resins are utilized as shaped products such as films or sheets, e.g., food-packaging materials, medicine-packaging materials, industrial-chemical-packaging materials, and agrochemical-packaging materials, and containers, e.g., bottles.

Although showing excellent gas barrier properties as stated above, EVOH resins have poor resistance to water and decrease in gas barrier property when wetted with water or placed in a high-humidity environment. Because of this, in cases when an EVOH resin is used in, for example, a packaging material for retort, a layer of the EVOH resin is generally disposed as an interlayer and sandwiched between polyolefin resin layers or other layers to configure a multilayer structure. With respect to EVOH resin layers, attempts are being made to heighten the resistance to water by incorporating a polyamide resin, e.g., a nylon, into an EVOH resin.

However, the incorporation of a polyamide resin into an EVOH resin results in a decrease in thermal stability, and this tends to result in the formation of heat deterioration products and crosslinking products during melt kneading or melt molding. There are hence cases where the molded materials have coloration or contain fish-eyes (fine particles of resin).

Patent Document 1, for example, proposes, as a technique for improving thermal stability during heating and melting, a resin composition including a saponified ethylene-vinyl acetate copolymer (A), a terminal-regulated polyamide resin (B) in which the ratio between the number (x) of terminal COOH groups and the number (y) of terminal CONRR' groups (where R is a hydrocarbon group having 1-22 carbon atoms and R' is H or a hydrocarbon group having 1-22 carbon atoms) has been regulated with a terminal regulator, a hindered phenol compound (C), and an aliphatic carboxylic acid/alkaline earth metal salt (D). Patent Document 1 indicates that the thermal stability is improved by adding an aliphatic carboxylic acid/alkaline earth metal salt to a mixture of an EVOH resin and a polyamide resin, thereby inhibiting gel formation and rendering long-run molding possible.

Meanwhile, a general method for diminishing the coloring of an EVOH resin composition during heating and melting is to regulate production conditions to be used in melting the composition with an extruder to produce pellet. For example, Patent Document 2 describes a feature wherein either a resin composition obtained by mixing an EVOH resin with a polyolefin resin or a resin composition obtained by mixing an EVOH resin with a polyamide resin is heated and melted so that the ratio (L/D) between the screw length L (mm) and screw outer diameter D (mm) of the extruder, the specific energy during the melt extrusion, the discharge amount per die nozzle, and the processing temperature are within specific ranges. Patent Document 2 indicates that by regulating the extrusion conditions for the heating and melting so as to be specific ranges, pellet containing no gel generation and having no coloration are obtained.

PRIOR ART DOCUMENTS

Patent Documents

Patent Document 1: JP-A-H6-345919
Patent Document 2: JP-A-2003-276021

SUMMARY OF THE INVENTION

Problem that the Invention is to Solve

However, the resin composition described in Patent Document 1 has a problem in that the composition tends to take a color upon heating and melting with an extruder and the molded objects obtained are unsuitable for use in applications where transparency is required. The technique described in Patent Document 2 has failed to produce a sufficient coloring-inhibitive effect, and a further improvement has been desired.

Accordingly, an object of the present invention is to provide ethylene-vinyl alcohol copolymer composition pellet reduced in coloration.

Means for Solving the Problem

The present inventor diligently made investigations under such circumstances and, as a result, has discovered that a resin composition including an EVOH resin, a polyamide resin, and an alkaline earth metal salt takes a color after having been extruded from the extruder rather than during the melt kneading. After having been extruded from the extruder, the resin pellet continuously remains in a high-temperature state. The present inventor directed attention to the fact that resin pellet including an EVOH resin, a polyamide resin, and an alkaline earth metal salt is prone to take a color at high temperatures, and has discovered that in cases when the resin which has just been discharged through the die (discharge-port die) of the extruder is regulated so as to have a lower temperature, then resin pellet reduced in coloration is obtained. The present invention has been thus completed.

The present invention includes the following configurations (1) to (6).

(1) An ethylene-vinyl alcohol copolymer composition pellet comprising: an ethylene-vinyl alcohol copolymer (A), a polyamide resin (B), and an alkaline earth metal salt (C), wherein a yellowness index (YI) value obtained by measuring the pellet with a spectral color-difference meter by a transmission method is 10 or less.

(2) The ethylene-ethylene-vinyl alcohol copolymer composition pellet according to (1), wherein a mass ratio ((A)/(B)) of the ethylene-vinyl alcohol copolymer (A) and the polyamide resin (B) is from 60/40 to 98/2.
(3) The ethylene-vinyl alcohol copolymer composition pellet according to (1) or (2), wherein a content of the alkaline earth metal salt (C), in terms of metal amount, is 10-200 ppm based on a sum of the ethylene-vinyl alcohol copolymer (A) and the polyamide resin (B).
(4) The ethylene-vinyl alcohol copolymer composition pellet according to any one of (1) to (3), which further contain an antioxidant.
(5) An ethylene-vinyl alcohol copolymer composition molding, which is obtained by melt-molding the ethylene-vinyl alcohol copolymer composition pellet according to any one of (1) to (4).
(6) A process for producing ethylene-vinyl alcohol copolymer composition pellet having a yellowness index (YI) value, as measured with a spectral color-difference meter by a transmission method, of 10 or less, comprising: a step in which a resin composition comprising an ethylene-vinyl alcohol copolymer (A), a polyamide resin (B), and an alkaline earth metal salt (C) is melt-kneaded using a melt-kneading device, wherein a temperature of an ethylene-vinyl alcohol copolymer composition strand just after being discharged from the melt-kneading device is 268° C. or lower.

Effects of the Invention

The present invention can provide ethylene-vinyl alcohol copolymer composition pellet reduced in coloration and having a yellowness index (YI) value of 10 or less. These pellets are hence suitable also for use in producing molded materials required to have transparency.

MODES FOR CARRYING OUT THE INVENTION

The configurations of the present invention are explained below in detail. However, the following explanations are on desirable embodiments, and the invention is not limited to the contents thereof.
In this description, all percentages by mass and parts by mass have the same meanings as percentages by weight and parts by weigh.
The ethylene-vinyl alcohol copolymer composition pellet of the invention is characterized by including an ethylene-vinyl alcohol copolymer (A), a polyamide resin (B), and an alkaline earth metal salt (C) and characterized in that a yellowness index (YI) value obtained by measuring the pellet with a spectral color-difference meter by a transmission method is 10 or less.
The components are explained below.
<Ethylene-Vinyl Alcohol Copolymer (A)>
The ethylene-vinyl alcohol copolymer (EVOH resin) to be used in the invention is a known resin and is a water-insoluble thermoplastic resin. The EVOH resin is usually obtained by copolymerizing a vinyl ester monomer with ethylene to obtain an ethylene-vinyl ester copolymer and saponifying the copolymer. That is, the EVOH resin mainly includes ethylene structural units and vinyl alcohol structural units and contains a slight amount of vinyl ester structural units remaining after the saponification step. For the copolymerization, a known polymerization method can be used, such as, for example, solution polymerization.
Examples of the vinyl ester monomer include aliphatic vinyl esters such as vinyl acetate, vinyl formate, vinyl propionate, vinyl valerate, vinyl butyrate, vinyl isobutyrate, vinyl pivalate, vinyl caprate, vinyl laurate, vinyl stearate, and vinyl Versatate and aromatic vinyl esters such as vinyl benzoate. Use may be made of aliphatic vinyl esters each having usually 3-20 carbon atoms, preferably 4-10 carbon atoms, especially preferably 4-7 carbon atoms. It is preferred to use vinyl acetate among these from the standpoint of profitability. One of these vinyl esters is usually sued alone, but two or more thereof may be simultaneously used according to need.
The EVOH resin has an ethylene content, which was determined during the polymerization of ethylene with the vinyl ester monomer. The ethylene content does not change through the saponification. The content of ethylene structural units, as determined in accordance with ISO 14663, is usually 20-60% by mole, preferably 25-50% by mole, especially preferably 25-45% by mole. Too low ethylene contents tend to result in decreases in impact resistance and processability. Too high ethylene contents tend to result in decreases in gas barrier property and solvent resistance.
The degree of saponification of the EVOH resin is usually 90-100% by mole, preferably 95-100% by mole, especially preferably 98-100% by mole, in terms of saponification degree determined by a titration method (JIS K6726) (the EVOH resin is examined in the state of an even solution in a water/methanol solvent). Too low degrees of saponification tend to result in a decrease in gas barrier property.
The EVOH resin has a melt flow rate (hereinafter often referred to as "MFR") of usually 0.1-100 g/10 min, preferably 1-50 g/10 min, more preferably 2-40 g/10 min, in terms of MFR measured at 210° C. under a load of 2,160 g. Too large or too small values thereof tend to result in a decrease in processability.
The EVOH has a melting point of usually 100-220° C., preferably 120-210° C., more preferably 140-200° C., in terms of melting point measured with a differential scanning calorimeter (DSC) at a heating rate of 10° C./min.
In the present invention, ethylenically unsaturated copolymerizable monomers may have been copolymerized, besides ethylene and the vinyl ester, in an amount which does not adversely affect the properties required of the EVOH resin (e.g., less than 10% by mole). Examples of the monomers include olefins such as propylene, 1-butene, and isobutene, hydroxyl-containing α-olefins such as 2-propen-1-ol, 3-buten-1-ol, 4-penten-1-ol, 5-hexen-1-ol, 3,4-dihydroxy-1-butene, and 5-hexene-1,2-diol, and products of acylation or esterification of these hydroxyl-containing α-olefins. Examples of the esterification products include 3,4-diacryloxy-1-butenes, in particular, 3,4-diacetoxy-1-butene. Examples of the monomers further include: hydroxyalkylvinylidenes such as 2-methylenepropane-1,3-diol and 3-methylenepentane-1,5-diol; and hydroxyalkylvinylidene diacetates such as 1,3-diacetoxy-2-methylenepropane, 1,3-dipropionyloxy-2-methylenepropane, and 1,3-dibutyronyloxy-2-methylenepropane. Examples thereof furthermore include unsaturated acids such as acrylic acid, methacrylic acid, crotonic acid, phthalic acid (anhydride), maleic acid (anhydride), and itaconic acid (anhydride), salts of these acids, and mono- or dialkyl esters of these acids, the one or two alkyl groups each having 1-18 carbon atoms. Examples thereof still further include: acrylamide and analogues thereof such as N-alkylacrylamides in which the alkyl has 1-18 carbon atoms, N,N-dimethylacrylamide, 2-acrylamidopropanesulfonic acid and salts thereof, and acrylamidopropyldimethylamine and acid salts or quaternary salts thereof; and methacrylamide and analogues thereof such as N-alkylmethacrylamides in which the alkyl has 1-18 carbon atoms, N,N-dimethylmethacrylamide, 2-methacrylamidopropanesulfonic acid and salts thereof; and methacrylamidopropyldimethylamine and acid salts and quaternary salts thereof. Examples thereof still further include N-vinylamides such as N-vinylpyrrolidone, N-vinylformamide, and N-vinylacetamide, vinyl cyanide compounds such as acrylonitrile and methacrylonitrile, vinyl ethers such as alkyl vinyl ethers in which the alkyl has 1-18 carbon atoms, hydroxyalkyl vinyl ethers, and alkoxyalkyl vinyl ethers, halogenated vinyl compounds such as vinyl chloride, vinylidene chloride, vinyl fluoride, vinylidene fluoride, and vinyl bromide, vinyl silane compounds such as trimethoxyvinylsilane, and other compounds including allyl acetate, allyl chloride, trimethyl(3-acrylamido-3-dimethylpropyl)ammonium chloride, acrylamido-2-methylpropanesulfonic acid, vinylethylene carbonate, and glycerin monoallyl ether. The EVOH resin may have undergone an "after modification" such as urethane formation, acetalization, cyanoethylation, or oxyalkylene formation.

Especially for use in applications where formability for stretching, vacuum/air-pressure forming, or the like is required, it is preferred to use an EVOH in which a hydroxy-containing α-olefin has been copolymerized, in particular, an EVOH having an 1,2-diol in side chains.

The EVOH resin to be used in the invention may contain other thermoplastic resins according to purposes. In the case where the EVOH resin contains other thermoplastic resins, the content of the other thermoplastic resins is usually less than 30% by mass based on the whole resin composition.

The EVOH resin may contain compounding ingredients according to need so long as the inclusion thereof does not lessen the effect of the invention. The amount of the compounding ingredients to be added is usually less than 5% by mass based on the resin composition. Examples of the compounding ingredients include fillers such as talc, calcium carbonate, mica, and glass fibers, plasticizers such as paraffin oil, antioxidants, heat stabilizers, light stabilizers, ultraviolet absorbers, oxygen absorbers, neutralizing agents, lubricants, antifogging agents, antiblocking agents, slip agents, crosslinking agents, crosslinking aids, colorants, flame retardants, dispersants, surfactants, drying agents, antistatic agents, fungistats, hardeners, blowing agents, nucleating agents, additives for biodegradation, fluorescent brighteners, and silane coupling agents. Any desired one or more compounding ingredients can be incorporated.

The inclusion of any containable resin and compounding ingredients, such as those shown above, means that the resin and the compounding ingredients have been evenly added to the resinous matter (evenly added to the inside of the pellet).

As the heat stabilizers, additives may be added for the purpose of improving various properties including the thermal stability during melt molding. Examples of the additives include: organic acids, such as acetic acid, propionic acid, butyric acid, lauric acid, stearic acid, oleic acid, and behenic acid, and salts thereof other than alkaline earth metal salts, such as alkali metal salts (sodium, potassium, etc.); and inorganic acids, such as sulfuric acid, sulfurous acid, carbonic acid, phosphoric acid, and boric acid, and salts thereof other than alkaline earth metal salts, such as alkali metal salts (sodium, potassium, etc.) and the zincsalts. Especially preferred of these are acetic acid, boron compounds including boric acid and salts thereof, acetic acid salts, and phosphoric acid salts.

In the case of adding acetic acid, the addition amount thereof, per 100 parts by mass of the EVOH resin, is usually 0.001-1 part by mass, preferably 0.005-0.2 parts by mass, especially preferably 0.01-0.1 part by mass. In case where the addition amount of acetic acid is too small, the effect of the inclusion of acetic acid tends not to be sufficiently obtained. Conversely, in case where the addition amount thereof is too large, an even film tends to be difficult to obtain.

In the case of adding a boron compound, the addition amount thereof, in terms of boron amount (determine by ashing and subsequent analysis by ICP emission spectroscopy) per 100 parts by mass of the EVOH resin, is usually 0.001-1 part by mass, preferably 0.002-0.2 parts by mass, especially preferably 0.005-0.1 part by mass. Too small addition amounts of the boron compound may result in cases where the effect of addition of the boron compound is not sufficiently obtained. Conversely, too large amounts thereof tend to make it difficult to obtain an even film.

The amount of an acetic acid salt or phosphoric acid salt (including phosphoric acid hydrogen salt) to be added, in terms of metal amount (determine by ashing and subsequent analysis by ICP emission spectroscopy) per 100 parts by mass of the EVOH resin (A), is usually 0.0005-0.1 part by mass, preferably 0.001-0.05 parts by mass, especially preferably 0.002-0.03 parts by mass. Too small addition amounts thereof may result in cases where the effect of inclusion thereof is not sufficiently obtained. Conversely, too large amounts thereof tend to make it difficult to obtain an even film. In the case of adding two or more salts to the EVOH resin, the total amount thereof is preferably in the addition amount range shown above.

Methods for adding acetic acid, a boron compound, an acetic acid salt, or a phosphoric acid salt to the EVOH resin are not particularly limited. Preferred examples thereof include: i) a method in which a porous precipitate of the EVOH resin which has a water content of 20-80% by mass is brought into contact with an aqueous solution of the additive to incorporate the additive into the porous precipitate, which is then dried; ii) a method which includes introducing the additive into an even solution (water/alcohol solution, etc.) of the EVOH resin, extruding the resultant mixture into strands and introducing the strands into a coagulating liquid, subsequently cutting the obtained strands to obtain pellet, and drying the pellet; iii) a method in which the EVOH resin is mixed with additives en bloc and the mixture is melt-kneaded with an extruder or the like; and iv) a method in which during production of the EVOH resin, the alkali (sodium hydroxide, potassium hydroxide, etc.) used in the saponification step is neutralized with an organic acid, e.g., acetic acid, and the amount of the remaining organic acid, e.g., acetic acid, and of the by-product salt is regulated by water washing.

Preferred from the standpoint of more remarkably obtaining the effect of the invention are methods i) and ii), which are excellent in terms of the dispersibility of the additive(s). In the case of incorporating an organic acid and a salt thereof, it is preferred to use either of these methods in combination with method iv).

The EVOH resin is supplied to the market usually in the form of pellet and subjected to various melt molding processes. Examples of the shape of the pellet include spherical, cylindrical, and cubic shapes and the shape of a rectangular parallelepiped. Usually, the pellet has a spherical shape (Rugby-ball shape) or a cylindrical shape, and the size thereof is as follows from the standpoint of convenience in later use as a molding material. In the case of a spherical shape, the diameter is usually 1-6 mm, preferably 2-5 mm, and the height is usually 1-6 mm, preferably 2-5 mm. In the case of a cylindrical shape, the diameter of the bottom face is usually 1-6 mm, preferably 2-5 mm, and the length is usually 1-6 mm, preferably 2-5 mm.

<Polyamide Resin (B)>

The polyamide resin (B) to be used in the invention is a known resin and is a water-insoluble thermoplastic resin.

Examples of the polyamide resin include aliphatic polyamide resins such as polycaproamide (nylon-6), poly(ω-aminoheptanoic acid) (nylon-7), poly(ω-aminononanoic acid) (nylon-9), polyundecanamide (nylon-11), and polylauryllactam (nylon-12). Examples thereof further include copolyamide resins such as aliphatic copolyamides, e.g., polyethylenediamineadipamide (nylon-26), polytetramethyleneadipamide (nylon-46), polyhexamethyleneadipamide (nylon-66), polyhexamethylenesebacamide (nylon-610), polyhexamethylenedodecamide (nylon-612), polyoctamethyleneadipamide (nylon-86), polydecamethyleneadipamide (nylon-108), caprolactam/lauryllactam copolymer (nylon-6/12), caprolactam/ω-aminononanoic acid copolymer (nylon-6/9), caprolactam/hexamethylenediammonium adipate copolymer (nylon-6/66), lauryllactam/hexamethylenediammonium adipate copolymer (nylon-12/66), ethylenediamineadipamide/hexamethylenediammonium adipate copolymer (nylon-26/66), caprolactam/hexamethylenediammonium adipate/hexamethylenediammonium sebacate copolymer (nylon-66/610), and ethyleneammonium adipate/hexamethylenediammonium adipate/hexamethylenediammonium sebacate copolymer (nylon-6/66/610), aromatic copolyamides, e.g., polyhexamethyleneisophthalamide, polyhexamethyleneterephthalamaide, poly-m-xylyleneadipamide, hexamethyleneisophthalamide/terephthalamide copolymers, poly-p-phenyleneterephthalamide, and poly-p-phenylene-(3,4'-diphenyl ether)terephthalamide, amorphous polyamides, and terminal-modified polyamides obtained by modifying terminals of these polyamide resins with carboxyl or amino groups using, for example, methylenebenzylamine or m-xylenediamine.

One of these polyamide resins can be used alone, or two or more thereof can be used in combination. It is preferred to use nylon-6 among those polyamide resins, from the standpoint of retort resistance in the case where the EVOH resin composition is used as the interlayer of a multilayer film.

The polyamide resin (B) preferably is one which has a melting point of usually 150-270° C., preferably 180-250° C., more preferably 200-230° C. The polyamide resin (B) preferably is one which has a melt flow rate (MFR), as measured at 230° C. under a load of 2,160 g, of usually 0.1-100 g/10 min, preferably 1-50 g/10 min, more preferably 3-20 g/10 min.

<Alkaline Earth Metal Salt (C)>

Examples of the alkaline earth metal salt (C) to be used in the invention include: organic acid salts such as the salts of alkaline earth metals with aliphatic carboxylic acids, e.g., acetic acid, propionic acid, butyric acid, lauric acid, stearic acid, oleic acid, and behenic acid, and with citric acid; and inorganic acid salts such as boric acid salts of alkaline earth metals, carbonic acid salts of alkaline earth metals, hydrogen carbonates of alkaline earth metals, and phosphoric acid salts of alkaline earth metals.

Examples of the alkaline earth metal salts with acetic acid include magnesium acetate, calcium acetate, and barium acetate.

Examples of the carbonic acid salts of alkaline earth metals include calcium carbonate, magnesium carbonate, and barium carbonate.

Examples of the hydrogen carbonates of alkaline earth metals include calcium hydrogen carbonate, magnesium hydrogen carbonate, and barium hydrogen carbonate.

Examples of the phosphoric acid salts of alkaline earth metals include calcium dihydrogen phosphate, magnesium monohydrogen phosphate, and barium hydrogen phosphate.

One of these alkaline earth metal salts can be incorporated alone, or two or more thereof can be incorporated in combination.

From the standpoint of the efficiency of producing the EVOH resin, water-soluble salts are preferred of these. From the standpoint of the moldability required for melt-molding the EVOH resin composition, organic acid salts are preferred as the alkaline earth metal salt, and salts with aliphatic carboxylic acids having 1-6 carbon atoms are preferred. It is especially preferred to use magnesium acetate.

In the invention, the mass ratio of the ethylene-vinyl alcohol copolymer (A) to the polyamide resin (B) ((A)/(B)) is preferably from 60/40 to 98/2. By regulating the mass ratio of the ethylene-vinyl alcohol copolymer (A) to the polyamide resin (B) to a value within that range, an EVOH resin composition having excellent retort resistance can be obtained. The mass ratio of the ethylene-vinyl alcohol copolymer (A) to the polyamide resin (B) is more preferably from 70/30 to 95/5, even more preferably 80/20 to 90/10.

The content of the alkaline earth metal salt (C), in terms of metal amount, is preferably 10-200 ppm, more preferably 10-100 ppm, even more preferably 10-50 ppm, of the sum of the ethylene-vinyl alcohol copolymer (A) and the polyamide resin (B). In case where the content of the alkaline earth metal salt (C) is too high, the pellet tends to contain gel particles or bubbles or have coloration and to show unstable moldability. In case where the content thereof is too low, the pellet tends to have a higher melt viscosity.

It is preferred to incorporate an antioxidant into the ethylene-vinyl alcohol copolymer composition pellet of the invention. The inclusion of an antioxidant can improve the thermal stability during molding.

Examples of the antioxidant include phenolic antioxidants, amine-compound antioxidants, aminoether-compound antioxidants, phosphorus-compound antioxidants, and sulfur-compound antioxidants.

Examples of the phenolic antioxidants include: monocyclic phenol compounds such as 2,6-di-t-butyl-p-cresol, 2,6-di-t-butyl-4-ethylphenol, 2,6-dicyclohexyl-4-methylphenol, 2,6-diisopropyl-4-ethylphenol, 2,6-di-t-amyl-4-methylphenol, 2,6-di-t-octyl-4-n-propylphenol, 2,6-dicyclohexyl-4-n-octylphenol, 2-isopropyl-4-methyl-6-t-butylphenol, 2-t-butyl-4-ethyl-6-t-octylphenol, 2-isobutyl-4-ethyl-6-t-hexylphenol, 2-cyclohexyl-4-n-butyl-6-isopropylphenol, styrenated mixed cresols, DL-α-tocopherol, and stearyl β-(3,5-di-t-butyl-4-hydroxyphenyl)propionate; dicyclic phenol compounds such as 2,2'-methylenebis(4-methyl-6-t-butylphenol), 4,4'-butylidenebis(3-methyl-6-t-butylphenol), 4,4'-thiobis(3-methyl-6-t-butylphenol), 2,2'-thiobis(4-methyl-6-t-butylphenol), 4,4'-methylenebis(2,6-di-t-butylphenol), 2,2'-methylenebis[6-(1-methylcyclohexyl)-p-cresol], 2,2'-ethylidenebis(4,6-di-t-butylphenol), 2,2'-butylidenebis(2-t-butyl-4-methylphenol), 3,6-dioxaoctamethylenebis[3-(3-t-butyl-4-hydroxy-5-methylphenyl)propionate], triethylene glycol bis[3-(3-t-butyl-5-methyl-4-hydroxyphenyl)propionate], 1,6-hexanediol bis[3-(3,5-di-t-butyl-4-hydroxyphenyl)propionate], and 2,2'-thiodiethylenebis[3-(3,5-di-t-butyl-4-hydroxyphenyl)propionate]; tricyclic phenol compounds such as 1,1,3-tris(2-methyl-4-hydroxy-5-t-butylphenyl)butane, 1,3,5-tris(2,6-dimethyl-3-hydroxy-4-t-butylbenzyl) isocyanurate, 1,3,5-tris[(3,5-di-t-butyl-4-hydroxyphenyl)propionyloxyethyl] isocyanurate, tris(4-t-butyl-2,6-dimethyl-3-hydroxybenzyl) isocyanurate, and 1,3,5-trimethyl-2,4,6-tris(3,5-di-t-butyl-4-hydroxybenzyl) benzene; tetracyclic phenol compounds such as tetrakis [methylene-3-(3,5-di-t-butyl-4-hydroxyphenyl)propionate] methane and pentaerythrityl tetrakis[3-(3,5-di-t-butyl-4-hydroxyphenyl)propionate]; and phosphorus-containing phenol compounds such as bis(ethyl 3,5-di-t-butyl-4-hydroxybenzylphosphonato)calcium and bis(ethyl 3,5-di-t-butyl-4-hydroxybenzylphosphonato)nickel.

Examples of the amine-compound antioxidants include bis(2,2,6,6-tetramethyl-4-piperidyl) sebacate, a polycondensate of dimethyl succinate with 1-(2-hydroxyethyl)-4-hydroxy-2,2,6,6-tetramethylpiperidineethanol, N,N',N'',N'''-tetrakis-[4,6-bis{butyl(N-methyl-2,2,6,6-tetramethyl-piperidin-4-yl)amino}triazin-2-yl]-4,7-diazadecan-1,10-diamine, a polycondensate of dibutylamine-1,3,5-triazine-N,N'-bis(2,2,6,6-tetramethyl-4-piperidyl-1,6-hexamethylene-diamine) with N-(2,2,6,6-tetramethyl-4-piperidyl)butyl-amine, poly[{6-(1,1,3,3-tetramethylbutyl)amino-1,3,5-triazine-2,4-diyl} {(2,2,6,6-tetramethyl-4-piperidyl)imino}hexamethylene{(2,2,6,6-tetramethyl-4-piperidyl)imino}], tetrakis(2,2,6,6-tetramethyl-4-piperidyl) 1,2,3,4-butanetetracarboxylate, 2,2,6,6-tetramethyl-4-piperidyl benzoate, bis(1,2,6,6-pentamethyl-4-piperidyl) 2-(3,5-di-t-butyl-4-hydroxybenzyl)-2-n-butylmalonate, bis(N-methyl-2,2,6,6-tetramethyl-4-piperidyl) sebacate, 1,1'-(1,2-ethanediyl)bis(3,3,5,5-tetramethylpiperazinone), (mixed 2,2,6,6-tetramethyl-4-piperidyl/tridecyl) 1,2,3,4-butanetetracarboxylate, (mixed 1,2,2,6,6-pentamethyl-4-piperidyl/tridecyl) 1,2,3,4-butane-tetracarboxylate, mixed [2,2,6,6-tetramethyl-4-piperidyl/β,β,β',β'-tetramethyl-3,9-{2,4,8,10-tetraoxaspiro(5,5)undecan- e}diethyl] 1,2,3,4-butanetetracarboxylate, mixed [1,2,2,6,6-pentamethyl-4-piperidyl/β,β,β',β'-tetramethyl-3,9-(2,4,8,10-tetraoxaspiro(5,5)undecane)diethyl] 1,2,3,4-buta-netetracarboxylate, an N,N'-bis(3-aminopropyl)ethylenedi-amine-2,4-bis[N-butyl-N-(1,2,2,6,6-pentamethyl-4-piperidyl)amino]-6-chloro-1,3,5-triazine condensate, poly[6-N-morpholyl-1,3,5-triazine-2,4-diyl][(2,2,6,6-tetramethyl-4-piperidyl)imino]hexamethylene[(2,2,6,6-tetramethyl-4-piperidyl)imide], a condensate of N,N'-bis(2,2,6,6-tetramethyl-4-piperidyl)hexamethylenediamine with 1,2-dibromoe-thane, and N-(2,2,6,6-tetramethyl-4-piperidyl)-2-methyl.

Examples of the aminoether-compound antioxidants include bis(2,2,6,6-tetramethyl-4-piperidyl) sebacate, bis(1,2,2,6,6-pentamethyl-4-piperidyl) sebacate, bis(1-methoxy-2,2,6,6-tetramethyl-4-piperidyl) sebacate, bis(1-ethoxy-2,2,6,6-tetramethyl-4-piperidyl) sebacate, bis(1-propoxy-2,2,6,6-tetramethyl-4-piperidyl) sebacate, bis(1-butoxy-2,2,6,6-tetramethyl-4-piperidyl) sebacate, bis(1-pentyloxy-2,2,6,6-tetramethyl-4-piperidyl) sebacate, bis(1-hexyloxy-2,2,6,6-tetramethyl-4-piperidyl) sebacate, bis(1-heptyloxy-2,2,6,6-tetramethyl-4-piperidyl) sebacate, bis(1-octoxy-2,2,6,6-tetramethyl-4-piperidyl) sebacate, bis(1-nonyloxy-2,2,6,6-tetramethyl-4-piperidyl) sebacate, bis(1-decanyloxy-2,2,6,6-tetramethyl-4-piperidyl) sebacate, and bis(1-dodecyloxy-2,2,6,6-tetramethyl-4-piperidyl) sebacate.

Examples of the phosphorus-compound antioxidants include triphenyl phosphite, diphenyl isodecyl phosphite, phenyl diisodecyl phosphite, 4,4'-butylidenebis(3-methyl-6-t-butylphenylditridecyl) phosphite, cyclic neopentanetetray-lbis(nonylphenyl) phosphite, cyclic neopentanetetraylbis(dinonylphenyl) phosphite, cyclic neopentanetetrayltris (nonylphenyl) phosphite, cyclic neopentanetetrayltris (dinonylphenyl) phosphite, 10-(2,5-dihydorxyphenyl)-10H-9-oxa-10-phosphaphenanthrene 10-oxide, diisodecyl pentaerythritol diphosphite, and tris(2,4-di-t-butylphenyl) phosphite.

Examples of the sulfur-compound antioxidants include dilauryl thiodipropionate, ditridecyl thiodipropionate, distearyl thiodipropionate, pentaerythritol tetrakis(3-dodecyl-thiopropionate), 4,4-thiobis(2-tert-butyl-5-methylphenol) bis-3-(dodecylthio)propionate, dimyristyl 3,3'-thiodipropionate, lauryl stearyl 3,3'-thiodipropionate, and neopenta-netetrayl tetrakis(3-laurylthiopropionate).

One of these antioxidants can be used alone, or two or more thereof can be used in combination. From the standpoint of thermal stability during molding, it is preferred to use phenolic antioxidants among those antioxidants. It is more preferred to use a hindered phenolic antioxidant.

The content of the antioxidant is preferably 0.1-200 ppm, more preferably 1-100 ppm, even more preferably 1-50 ppm, per 100 parts by mass of the sum of the EVOH resin (A) and the polyamide resin (B). In cases when the content of the antioxidant is within that range, the composition pellet shows satisfactory thermal stability during molding.

Other additives can be incorporated into the ethylene-vinyl alcohol copolymer composition pellet of the invention so long as the incorporation thereof does not lessen the effect of the invention.

Examples of the other additives include plasticizers, stabilizers, fillers, colorants, lubricants, antiblocking agents, and antistatic agents.

In the invention, the ethylene-vinyl alcohol copolymer composition pellet is characterized in that a yellowness index (YI) value obtained by measuring the pellet with a spectral color-difference meter by a transmission method is 10 or less.

The yellowness index (YI) value of 10 or less enables the resin pellet to retain transparency. The yellowness index (YI) value thereof is more preferably 8 or less.

The yellowness index (YI) value can be determined, for example, by packing the pellet into a cylindrical glass cell having a diameter of 35 mm and a height of 30 mm to produce a sample to be examined and examining this sample with a spectral color-difference meter by a transmission method in accordance with JIS Z-8722.

<Process for Producing the Ethylene-Vinyl Alcohol Copolymer Composition Pellet>

Processes for producing the ethylene-vinyl alcohol copolymer composition pellet of the invention are not particularly limited.

Examples of methods for mixing ingredients (A) to (C) include: (1) a method in which a polyamide resin (B) is mixed with a composition prepared beforehand by mixing an ethylene-vinyl alcohol copolymer (A) with an alkaline earth metal salt (C); (2) a method in which an ethylene-vinyl alcohol copolymer (A) is mixed with a composition prepared beforehand by mixing a polyamide resin (B) with an alkaline earth metal salt (C); and (3) a method in which an ethylene-vinyl alcohol copolymer (A), a polyamide resin (B), and an alkaline earth metal salt (C) are mixed together en bloc. Method (1) is preferred from the standpoints of the effect of improving the physical properties of the EVOH resin and production efficiency.

Examples of methods for use in method (1) above include: i) a method in which a porous precipitate of the EVOH resin which has a water content of 20-80% by mass is brought into contact with an aqueous solution of the alkaline earth metal salt (C) and is then dried; ii) a method which includes introducing the alkaline earth metal salt (C) into an even solution (water/alcohol solution, etc.) of the EVOH resin, extruding the resultant mixture into strand and introducing the strand into a coagulating liquid, subsequently cutting the obtained strand to obtain pellet, and drying the pellet; and iii) a method in which the EVOH resin is mixed with the alkaline earth metal salt (C) en bloc and the mixture is melt-kneaded with an extruder or the like. Method i) is preferred from the standpoints of the effect of improving the physical properties of the EVOH resin and production efficiency.

The ethylene-vinyl alcohol copolymer composition pellet of the invention can be obtained by mixing the ethylene-vinyl alcohol copolymer (A), the polyamide resin (B), and the alkaline earth metal salt (C) in any of the manners described above, melt-kneading the resultant composition using a melt-kneading device, and discharging the melt-kneaded composition from the melt-kneading device so that the composition, just after the discharge, has a resin temperature lower than in conventional pellet production.

The present inventor directed attention to the fact that in cases when a resin composition including an EVOH resin, a polyamide resin, and an alkaline earth metal salt is melt-kneaded, then coloring proceeds when the resin composition in a high-temperature state is in contact with air. Although an alkaline earth metal salt must be incorporated into EVOH resin/polyamide resin compositions in order to improve various physical properties, it is presumed that the alkaline earth metal salt acts as a catalyst to promote the deterioration of the resin compositions. The present inventor directed attention to the temperature of the strands which have just been discharged from the extruder, and has discovered that resin pellet reduced in coloration are obtained by regulating that temperature so as to be lower than in conventional pellet production and thereby inhibiting the EVOH resin/polyamide resin composition from deteriorating. The present invention has been thus completed.

Examples of the melt-kneading device include kneading machines, extruders, mixing rolls, Banbury mixer, kneader-rudder, and blast mills. Especially suitable is a method in which use is made of an extruder capable of continuous processing and excellent in terms of mixing efficiency.

As the extruder, either a single-screw extruder or a twin-screw extruder can be used. Preferred of these is a twin-screw extruder, in particular, a twin-screw extruder of the type in which the screws rotate in the same direction, because sufficient kneading is obtained therein due to moderate shearing.

The extruder has an effective screw length (L/D) of usually 10-100, preferably 15-70, more preferably 40-60. Too small values of L/D may result in cases where the melt-kneading is insufficient and dispersion evenness is insufficient. Meanwhile, too large values of L/D tend to result in excessive shearing and excessive stagnation to cause decomposition due to the heat generated by the shearing. In the case of an extruder in which the screws have a plurality of kneading zones, the L/D of the kneading zones is usually 3-15, preferably 5-10, especially preferably 5-8, in terms of the sum of the L/D values of the respective kneading zones. In cases when the L/D of the kneading zones is within that range, regulation to the desired temperature which will be shown later tends to be easy, The rotational speed of the screws is usually 100-1,000 rpm, preferably 300-800 rpm, more preferably 400-600 rpm. Too low rotational speeds of the screws tend to result in unstable discharge. Too high rotational speeds may result in cases where the resin temperature just after discharge from the extruder cannot be regulated to 268° C. or lower and the resultant pellet has coloration.

The shape of the die (discharge-port die) is usually circular. The diameter thereof is usually 1-10 mm, preferably 3-5 mm, especially preferably 3.5-4.5 mm. Too large diameters thereof tend to result in unstable strands and hence in a decrease in production efficiency. Too small diameters thereof tend to result in difficulties in regulating to the desired temperature which will be shown later.

The temperature of the composition in a molten state in the extruder is usually 150-300° C., preferably 180-290° C., more preferably 200-280° C. Too low temperatures of the composition may result in cases where the melt kneading is insufficient and even resin pellet is not obtained. Meanwhile, too high temperatures of the composition may result in cases where the resin temperature of just after discharge from the extruder cannot be regulated so as to be low and the resultant pellet has coloration.

The regulation of the temperature of the composition can be attained by suitably setting the cylinder temperatures within the extruder and the rotational speed of the screws.

The temperature of the resin pellet (strand-shaped kneaded mixture) which have just been discharged from the melt-kneading device, e.g., an extruder, is lower than in conventional pellet production. The temperature thereof is usually higher by 5-48° C. than the melting point of the polyamide resin (B), preferably higher by 10-40° C. than the melting point of the polyamide resin (B), especially preferably higher by 20-30° C. than the melting point of the polyamide resin (B). The melting point can be obtained, for example, by examining the polyamide resin with a differential scanning calorimeter (DSC).

The temperature of the resin pellet (strand-shaped kneaded mixture) which have just been discharged from the melt-kneading device, e.g., an extruder, is usually 268° C. or lower, preferably 230-266° C., more preferably 240-266° C. By regulating the temperature of the pellet (strands) which have just been discharged to a value within that range, ethylene-vinyl alcohol copolymer composition pellet reduced in coloration can be obtained.

Methods for regulating the resin temperature of just after discharge are not particularly limited. Examples thereof in the case of using an extruder as the melt-kneading device, include: a method in which the barrel temperatures of the extruder are regulated; a method in which a portion of the extruder which is close to the die (discharge-port die) is made to have a lower temperature; a method in which cold air is blown against the pellet that have just been discharged through the die of the extruder, a method in which the strands that have just been discharged through the die of the extruder are cooled with water, a method in which screws having a smaller number of kneading zones are used in the extruder, a method in which screws having kneading zones with a small value of L/D are used in the extruder, and a method in which the die (discharge-port die) of the extruder is made to have a larger diameter. By synthetically regulating these factors, the resin temperature of just after discharge is regulated.

The ethylene-vinyl alcohol copolymer composition pellet thus obtained has a yellowness index (YI) value, as measured with a spectral color-difference meter by a transmission method, of 10 or less. Molded material reduced in coloration can be obtained therefrom.

In the invention, the specific energy (kWh/kg) during the melt extrusion is preferably in the range of 0.1-0.5. Specific energies less than 0.1 may result in cases where sufficient melt kneading is impossible. Conversely, specific energies exceeding 0.5 may result in cases where the resin composition deteriorates thermally to have coloration or the resultant pellet frequently gives molded material which contain fish-eyes. The value of specific energy can be determined by dividing the electric power supplied to the screw motor of the extruder by the amount of the resin composition discharged from the extruder.

The ethylene-vinyl alcohol copolymer composition pellet of the invention can be formed, by melt molding, into various molded materials including thin films such as films and sheets, hollow containers such as bags, cups, trays, tubes, bottles, and tanks, and lid or cover materials.

Examples of methods for the melt molding include extrusion molding methods such as T-die extrusion, inflation extrusion, blow molding, melt spinning, and profile extrusion and injection molding methods. Temperatures for such melt molding are usually 190-250° C.

The ethylene-vinyl alcohol copolymer composition pellet of the invention can be melt-molded into various molded materials each constituted of a single layer. However, from the standpoints of preventing the gas barrier properties from decreasing during use in the presence of water and of improving the mechanical strength, etc., it is preferable that the EVOH resin composition layers should be laminated with layers of a thermoplastic resin other than EVOH resins, thereby configuring multilayered structures for use as various molded materials.

Examples of the thermoplastic resin (hereinafter often referred to as "other thermoplastic resin") constituting the layers of a thermoplastic resin other than EVOH resins include polyolefin resins in a broad sense, such as: olefin homopolymers or copolymers including polyethylene resins, e.g., linear low-density polyethylene, low-density polyethylene, ultralow-density polyethylene, medium-density polyethylene, high-density polyethylene, and ethylene-α-olefin (α-olefin having 4-20 carbon atoms) copolymers, polypropylene resins such as polypropylene and propylene/α-olefin (α-olefin having 4-20 carbon atoms) copolymers, ethylene-vinyl acetate copolymers, ionomers, ethylene-propylene (block and random) copolymers, ethylene-acrylic acid copolymers, ethylene-acrylic ester copolymers, polybutene, and polypentene; and resins obtained by graft-modifying these olefin homopolymers or copolymers with an unsaturated carboxylic acid or an ester thereof. Examples of the other thermoplastic resin further include polyester resins, polyamide resins (including copolyamides), poly (vinyl chloride), poly(vinylidene chloride), acrylic resins, polystyrene, vinyl ester resins, polyester elastomers, polyurethane elastomers, chlorinated polyethylene, chlorinated polypropylene, aromatic or aliphatic polyketones, and polyalcohols obtained by reducing these polymers.

It is preferred to use hydrophobic resins among these resins, for the purpose of inhibiting the resin composition from decreasing in gas barrier property. Specifically, polyolefin resins are preferred. In particular, polyethylene resins and polypropylene resins are preferred.

Such a multilayered structure may include two or more layers of the EVOH resin composition and two or more layers of other thermoplastic resin.

A layer of the EVOH resin composition and layers of other thermoplastic resin may be disposed so that an adhesive resin layer is interposed between the layer of the EVOH resin composition and each layer of other thermoplastic resin.

Examples of the adhesive resin layer include carboxyl-containing modified olefin polymers obtained by chemically bonding an unsaturated carboxylic acid or the anhydride thereof to olefin polymers (the olefin resins mentioned above) by addition reaction, graft reaction, etc. Specific examples thereof include polyethylene graft-modified with maleic anhydride, polypropylene graft-modified with maleic anhydride, ethylene-propylene (block and random) copolymers graft-modified with maleic anhydride, ethylene-ethyl acrylate copolymers graft-modified with maleic anhydride, and ethylene-vinyl acetate copolymers graft-modified with maleic anhydride. One polymer selected from such polymers or a mixture of two or more thereof is suitable. The amount of the unsaturated carboxylic acid or anhydride thereof which is contained in this thermoplastic resin is usually 0.001-3% by mass, preferably 0.01-1% by mass, especially preferably 0.03-0.5% by mass. In case where the amount of the modifying acid or anhydride in the modified resin is too small, this modified resin tends to have insufficient adhesiveness. Conversely, in case where the amount thereof is too large, this modified resin tends to undergo a crosslinking reaction, resulting in poor moldability.

The layers of other thermoplastic resin and the layers of an adhesive resin may contain known ingredients which are usually incorporated, such as, for example, an antioxidant, antistatic agent, plasticizer, lubricant, nucleating agent, anti-blocking agent, and wax.

The multilayered structure is not particularly limited in the configuration thereof so long as the multilayered structure includes at least one layer of the EVOH resin composition according to the invention. It is, however, preferable that the layer of the EVOH resin composition of the invention is an interlayer for the purpose of preventing the resin composition from being reduced in gas barrier performance by water. It is preferable that layers of other thermoplastic resin be outer layers. Namely, in the case where such a multilayered structure is a packaging material, the layers of other thermoplastic resin (in particular, layers of a hydrophobic resin) are the layer which comes into contact with the contents and the layer which comes into contact with the surrounding atmosphere.

The layer configuration of the multilayered structure may be as follows. In cases when a layer of the EVOH resin composition of the invention is expressed by a (a1, a2, . . . ) and a layer of other thermoplastic resin is expressed by b (b1, b2, . . . ), then the number of layers is usually 3-20, preferably 3-15, especially preferably 3-10. Specifically, any desired combinations are possible, such as b/a/b, a/b/a, a1/a2/b, a/b1/b2, b2/b1/a/b1/b2, and b2/b1/a/b1/a/b1/b2.

Furthermore, such multilayered structure can include one or more recycle layers including a mixture of the EVOH resin composition and a thermoplastic resin other than EVOH resins and obtained by re-melting and re-molding, for example, the trimmings and defectives generated during production of the multilayered structure. In cases when such a recycle layer is expressed by R, examples of the layer configuration of this multilayered structure include b/a/R, R/b/a, b/R/a/b, b/R/a/R/b, b/a/R/a/b, and b/R/a/R/a/R/b.

To dispose such recycle layers is industrially preferred from the standpoint that a large amount of scraps generated during molding can be effectively utilized.

The thickness of each layer in the multilayered structure is regulated in accordance with the layer configuration, uses, container form, required properties, etc. Examples thereof are as follows. In cases when there are two or more layers of at least one of the EVOH resin composition, adhesive resin, and other thermoplastic resin, the following numerical values indicate the thickness of the thickest layer of these.

The thickness of the layer of the EVOH resin composition of the invention is usually 1-500 μm, preferably 3-300 μm, more preferably 5-200 μm. In case where the EVOH resin composition layer is too thin, the multilayered structure tends to have reduced gas barrier properties. In case where the EVOH resin composition layer is too thick, the molded material obtained tends to be reduced in flexibility and formability.

The thickness of the layer of other thermoplastic resin is usually 10-6,000 μm, preferably 20-4,000 μm, especially preferably 100-2,000 μm. In case where the layer of other thermoplastic resin is too thin, the molded material obtained tends to have reduced rigidity. In case where the layer of other thermoplastic resin is too thick, the shaped object obtained tends to be reduced in flexibility and formability.

The thickness of the adhesive resin layer is usually 1-100 μm, preferably 2-50 μm, especially preferably 5-40 μm.

Thickness ratios between the layers are as follows. The thickness ratio of (EVOH resin composition layer)/(layer of other thermoplastic resin) is usually from 0.005 to less than 1, preferably from 0.01 to less than 1, especially preferably 0.02-0.2. The thickness ratio of (resin composition layer)/(adhesive resin layer) is usually 0.2-100, preferably 1-10, especially preferably 1-5.

The multilayered structure may be stretched by a known method.

The stretching may be performed by a known stretching method. Examples thereof include uniaxial stretching and biaxial stretching. As a method for stretching with heating, use can be made of roll stretching, tenter stretching, tubular stretching, simultaneous injection/stretch blowing, deep drawing, vacuum forming, air-pressure forming, vacuum/air-pressure forming, plug-assist vacuum/air-pressure forming, or the like. In the case of biaxial stretching, either a simultaneous biaxial stretching mode or a sequential biaxial stretching mode can be employed. In the case of simultaneous injection/stretch blowing, either a cold parison method or a hot parison method can be employed. A stretching temperature, in terms of the temperature of the multilayered structure (temperature of a portion near the multilayered structure), is selected from the range of usually about 80-200° C., preferably about 100-160° C. The stretch ratio is usually 2-100, preferably 2-50, in terms of areal ratio.

The thicknesses of the layers in the stretched multilayered structure are, for example, as follows. The thickness of the EVOH resin composition layer is usually 0.1-200 μm, preferably 1-100 μm. The thickness of the layer of other thermoplastic resin is usually 1-1,000 μm, preferably 3-500 μm. The thickness of the adhesive resin layer is usually 0.1-50 μm, preferably 1-30 μm. The thickness ratios between the layers are as follows. The thickness ratio of (EVOH resin composition layer)/(layer of other thermoplastic resin) is usually from 0.0002 to less than 1, preferably from 0.01 to less than 1. The thickness ratio of (EVOH resin composition layer)/(adhesive resin layer) is 0.2-100, preferably 1-10.

The multilayered structure thus obtained can be processed into thin films, such as films and sheets, bags, hollow containers, such as cups, trays, tubes, bottles, and tanks, and containers of shapes such as lid or cover materials.

Such containers are useful as various kinds of packaging containers not only for general foods but also for seasonings such as mayonnaise and dressing fermented foods such as miso, fat or oil foods such as salad oil, beverages, cosmetics, medicines, agricultural chemicals, industrial chemicals, etc.

EXAMPLES

The present invention is explained below in more detail by reference to Examples, but the invention should not be construed as being limited to the following Examples unless the invention departs from the spirit thereof.

In the following Examples and Comparative Examples, "parts" and "%" are by mass unless otherwise indicated.

Example 1

Use was made of: 85 parts of an EVOH resin (A) (ethylene content, 29% by mole; degree of saponification, 99.6% by mole; MFR, 4.1 g/10 min (210° C.; load, 2,160 g); melting point, 185.6° C.), which contained magnesium acetate as an alkaline earth metal salt (C) in an amount of 35 ppm in terms of metal amount and which had been obtained by bringing a porous precipitate of hydrous EVOH into contact with an aqueous solution of the alkaline earth metal salt (C) and then drying the porous precipitate; 15 parts of "NOVAMID 1028EN" (trade name; manufactured by Mitsubishi Engineering-Plastics Corp.; melting point, 220° C.), which is nylon-6, as a polyamide resin (B); and 0.001 part of a hindered phenol compound (pentaerythrityl tetrakis[3-(3,5-di-t-butyl-4-hydroxyphenyl)propionate] "Irganox 1010" (trade name; manufactured by Ciba-Geigy Ltd.)) as an antioxidant.

The mass ratio of the EVOH resin (A) to the polyamide resin (B), (A)/(B), was 85/15. The content of the alkaline earth metal salt (C), in terms of metal amount, was 30 ppm of the sum of the EVOH resin (A) and the polyamide resin (B).

These ingredients were introduced into an extruder, which employed screws for weak kneading (manufactured by The Japan Steel Works, Ltd.), and heated in a nitrogen atmosphere under the conditions of a screw rotational speed of 500 rpm, a die discharge port diameter of 4.0 mm, and extruder barrel temperatures (° C.) of C2/C3/C4/C5/C6/C7/C8/C9/C10/C11/C12/C13/C14/C15=100/230/230/230/230/230/230/230/230/230/230/210/210/210. Thus, ethylene-vinyl alcohol copolymer composition pellets were produced.

The screws for weak kneading each had two kneading zones, and the total L/D of these kneading zones was 6.5.

The pellets obtained through such melt kneading were examined for strand temperature of just after discharge through the die discharge ports with "Infrared Thermometer FLIRi3" (trade name), manufactured by FLIR Inc.

The pellets were packed into a cylindrical glass cell having a diameter of 35 mm and a height of 30 mm, and this cell was tapped three times. Thereafter, the pellets lying above the brim were scraped oft thereby obtaining a sample for yellowness index (YI) measurement. The yellowness index (YI) value of the obtained sample for YI measurement was measured with "Spectral Color-Difference Meter SE6000" (trade name), manufactured by Nippon Denshoku Kogyo K.K., in accordance with JIS Z-8722.

The specific energy for melt-kneading the resin composition was determined from the amount of the resin composition discharged from the extruder and the electric power supplied to the screw motor.

The results thereof are shown in Table 1.

Example 2

Ethylene-vinyl alcohol copolymer composition pellets were produced in the same manner as in Example 1, except that the melt kneading conditions were changed so that the screw rotational speed was 456 rpm and the extruder barrel temperatures (° C.) were C2/C3/C4/C5/C6/C7/C8/C9/C10/C11/C12/C13/C14/C15=100/230/230/230/230/240/240/240/240/240/240/240/240/240.

The strand temperature of just after discharge through the die discharge ports, the yellowness index (YI) value of the molded material, and the specific energy were determined. The results thereof are shown in Table 1.

Comparative Example 1

Ethylene-vinyl alcohol copolymer composition pellets were produced in the same manner as in Example 1, except that the melt kneading conditions were changed so that the extruder barrel temperatures (° C.) were C2/C3/C4/C5/C6/C7/C8/C9/C10/C11/C12/C13/C14/C15=100/230/230/230/230/240/240/240/240/240/240/240/240/240.

The strand temperature of just after discharge through the die discharge ports, the yellowness index (YI) value of the molded material, and the specific energy were determined. The results thereof are shown in Table 1.

Comparative Example 2

Ethylene-vinyl alcohol copolymer composition pellets were produced in the same manner as in Example 1, except that screws for normal kneading (manufactured by The Japan Steel Works, Ltd.) were used as the screws and that the melt kneading conditions were changed so that the extruder barrel temperatures (° C.) were C2/C3/C4/C5/C6/C7/C8/C9/C10/C11/C12/C13/C14/C15=100/230/230/230/230/240/240/240/240/240/240/240/240. The screws for normal kneading each had two kneading zones, and the total L/D of these kneading zones was 10.25.

The strand temperature of just after discharge through the die discharge ports, the yellowness index (YI) value of the molded object, and the specific energy were determined. The results thereof are shown in Table 1.

regulating the resin temperature of just after discharge through the die discharge ports so as to be lower than in conventional pellet production, in particular, to 268° C. or lower.

While the invention has been described in detail and with reference to specific embodiments thereof, it will be apparent to one skilled in the art that various changes and modifications can be made therein without departing from the spirit and scope thereof. This application is based on a Japanese patent application filed on Dec. 24, 2015 (Application No. 2015-251832), the contents thereof being incorporated herein by reference.

INDUSTRIAL APPLICABILITY

The ethylene-vinyl alcohol copolymer composition pellets give molded materials which have excellent gas barrier properties and reduced coloration, and are extremely useful industrially.

The invention claimed is:
1. An ethylene-vinyl alcohol copolymer composition pellet comprising:
an ethylene-vinyl alcohol copolymer (A),
a polyamide resin (B) having a melting point of 180-270° C.,
an alkaline earth metal salt (C), the alkaline earth metal salt (C) including a salt of magnesium with an aliphatic carboxylic acid having 1-6 carbon atoms wherein a content of the salt of magnesium with an aliphatic carboxylic acid having 1-6 carbon atoms, in terms of metal amount, is 10-50 ppm based on a sum of the ethylene-vinyl alcohol copolymer (A) and the polyamide resin (B),

TABLE 1

| | Screws | Screw Rotational speed | Barrel temperatures of extruder (° C.) | Resin temperature of just after discharge through die dischare ports | YI value | Specific energy |
|---|---|---|---|---|---|---|
| Example 1 | weak-kneading screws | 500 rpm | C2/C3/C4/C5/C6/C7/C8/C9/C10/C11/C12/C13/C14/C15 = 100/230/230/230/230/230/230/230/230/230/230/210/210/210 | 246° C. | 5 | 0.26 |
| Example 2 | weak-kneading screws | 456 rpm | C2/C3/C4/C5/C6/C7/CS/C9/C10/C11/C12/C13/C14/C15 = 100/230/230/230/240/240/240/240/240/240/240/240/240 | 266° C. | 7 | 0.24 |
| Comparative Example 1 | weak-kneading screws | 500 rpm | C2/C3/C4/C5/C6/C7/C8/C9/C10/C11/C12/C13/C14/C15 = 100/230/230/230/240/240/240/240/240/240/240/240/240 | 270° C. | (*) | 0.25 |
| Comparative Example 2 | normal-kneading screws | 500 rpm | C2/C3/C4/C5/C6/C7/CS/C9/C10/C11/C12/C13/C14/C15 = 100/230/230/230/240/240/240/240/240/240/240/240/240 | 270° C. | 16 | 0.25 |

*The YI value in Comparative Example 1 was visually rated as equal to or larger than that in Comparative Example 2.

The results given in Table 1 show that ethylene-vinyl alcohol copolymer composition pellets having reduced coloration with a yellowness index (YI) value of 10 or less were obtained in Examples 1 and 2. In contrast, the ethylene-vinyl alcohol copolymer composition pellets obtained in each of Comparative Examples 1 and 2 had a yellowness index (YI) value exceeding 10 and had coloration.

It was thus found that ethylene-vinyl alcohol copolymer composition pellets reduced in coloration are obtained by 0% of any of an ethylene-unsaturated carboxylic acid random copolymer and a metal salt thereof, and optionally, an antioxidant in an amount of 0.1-200 ppm per 100 parts by mass of the sum of the ethylene-vinyl alcohol copolymer (A) and the polyamide resin (B);

wherein a yellowness index (YI) value obtained by measuring the pellet with a spectral color-difference meter by a transmission method is 10 or less.

2. The ethylene-ethylene-vinyl alcohol copolymer composition pellet according to claim 1, wherein a mass ratio ((A)/(B)) of the ethylene-vinyl alcohol copolymer (A) and the polyamide resin (B) is from 60/40 to 98/2.

3. The ethylene-vinyl alcohol copolymer composition pellet according to claim 1, which comprises the antioxidant.

4. An ethylene-vinyl alcohol copolymer composition molding, which is obtained by melt-molding the ethylene-vinyl alcohol copolymer composition pellet according to claim 1.

5. The ethylene-vinyl alcohol copolymer composition pellet according to claim 1, wherein the ethylene-vinyl alcohol copolymer composition pellet is made by a process consisting of melt-kneading the ethylene-vinyl alcohol copolymer (A), the polyamide resin (B), the alkaline earth metal salt (C) and optionally the antioxidant, in a melt-kneading device, and discharging the ethylene-vinyl alcohol copolymer composition from the melt-kneading device such that the temperature of the ethylene-vinyl alcohol copolymer composition after being discharged is 268° C. or less, and then cutting the discharged ethylene-vinyl alcohol copolymer composition into pellets.

6. A process for producing ethylene-vinyl alcohol copolymer composition pellet having a yellowness index (YI) value, as measured with a spectral color-difference meter by a transmission method, of 10 or less, comprising:
melt-kneading a resin composition comprising
an ethylene-vinyl alcohol copolymer (A),
a polyamide resin (B) having a melting point of 180-270° C.,
an alkaline earth metal salt (C), the alkaline earth metal salt (C) including a salt of magnesium with an aliphatic carboxylic acid having 1-6 carbon atoms, wherein a content of the salt of magnesium with an aliphatic carboxylic acid having 1-6 carbon atoms, in terms of metal amount, is 10-50 ppm based on a sum of the ethylene-vinyl alcohol copolymer (A) and the polyamide resin (B),
0% of any of an ethylene-unsaturated carboxylic acid random copolymer and a metal salt thereof, and
optionally, an antioxidant in an amount of 0.1-200 ppm per 100 parts by mass of the sum of the ethylene-vinyl alcohol copolymer (A) and the polyamide resin (B)
using a melt-kneading device,
wherein a temperature of an ethylene-vinyl alcohol copolymer composition strand just after being discharged from the melt-kneading device is 268° C. or lower.

7. The process of claim 6, wherein a temperature of the ethylene-vinyl alcohol copolymer composition strand just after being discharged from the melt-kneading device is higher by 5-48° C. than the melting point of the polyamide resin (B).

8. An ethylene-vinyl alcohol copolymer composition pellet comprising:
an ethylene-vinyl alcohol copolymer (A),
a polyamide resin (B) having a melting point of 180-270° C.,
an alkaline earth metal salt (C), the alkaline earth metal salt (C) including a salt of magnesium with an aliphatic carboxylic acid having 1-6 carbon atoms, wherein a content of the salt of magnesium with an aliphatic carboxylic acid having 1-6 carbon atoms, in terms of metal amount, is 10-50 ppm based on a sum of the ethylene-vinyl alcohol copolymer (A) and the polyamide resin (B),
0% of a thermoplastic resin other than the ethylene-vinyl alcohol copolymer (A) and the polyamide resin (B), and
optionally, an antioxidant in an amount of 0.1-200 ppm per 100 parts by mass of the sum of the ethylene-vinyl alcohol copolymer (A) and the polyamide resin (B);
wherein a yellowness index (YI) value obtained by measuring the pellet with a spectral color-difference meter by a transmission method is 10 or less.

9. The ethylene-ethylene-vinyl alcohol copolymer composition pellet according to claim 8, wherein a mass ratio ((A)/(B)) of the ethylene-vinyl alcohol copolymer (A) and the polyamide resin (B) is from 60/40 to 98/2.

10. The ethylene-vinyl alcohol copolymer composition pellet according to claim 8, which comprises the antioxidant.

11. An ethylene-vinyl alcohol copolymer composition molding, which is obtained by melt-molding the ethylene-vinyl alcohol copolymer composition pellet according to claim 8.

12. The ethylene-vinyl alcohol copolymer composition pellet according to claim 8, wherein the ethylene-vinyl alcohol copolymer composition pellet is made by a process consisting of melt-kneading the ethylene-vinyl alcohol copolymer (A), the polyamide resin (B), the alkaline earth metal salt (C) and optionally the antioxidant, in a melt-kneading device, and discharging the ethylene-vinyl alcohol copolymer composition from the melt-kneading device such that the temperature of the ethylene-vinyl alcohol copolymer composition after being discharged is 268° C. or less, and then cutting the discharged ethylene-vinyl alcohol copolymer composition into pellets.

13. A process for producing ethylene-vinyl alcohol copolymer composition pellet having a yellowness index (YI) value, as measured with a spectral color-difference meter by a transmission method, of 10 or less, comprising:
melt-kneading a resin composition comprising
an ethylene-vinyl alcohol copolymer (A),
a polyamide resin (B) having a melting point of 180-270° C.,
an alkaline earth metal salt (C), the alkaline earth metal salt (C) including a salt of magnesium with an aliphatic carboxylic acid having 1-6 carbon atoms, wherein a content of the salt of magnesium with an aliphatic carboxylic acid having 1-6 carbon atoms, in terms of metal amount, is 10-50 ppm based on a sum of the ethylene-vinyl alcohol copolymer (A) and the polyamide resin (B),
0% of a thermoplastic resin other than the ethylene-vinyl alcohol copolymer (A) and the polyamide resin (B), and
optionally, an antioxidant in an amount of 0.1-200 ppm per 100 parts by mass of the sum of the ethylene-vinyl alcohol copolymer (A) and the polyamide resin (B)
using a melt-kneading device,
wherein a temperature of an ethylene-vinyl alcohol copolymer composition strand just after being discharged from the melt-kneading device is 268° C. or lower.

14. The process of claim 13, wherein a temperature of the ethylene-vinyl alcohol copolymer composition strand just after being discharged from the melt-kneading device is higher by 5-48° C. than the melting point of the polyamide resin (B).

15. The ethylene-vinyl alcohol copolymer composition pellet according to claim 3, wherein the antioxidant is a phenolic antioxidant.

16. The ethylene-vinyl alcohol copolymer composition pellet according to claim 15, wherein the antioxidant is a hindered phenolic antioxidant.

* * * * *

UNITED STATES PATENT AND TRADEMARK OFFICE
CERTIFICATE OF CORRECTION

| | |
|---|---|
| PATENT NO. | : 11,667,761 B2 |
| APPLICATION NO. | : 16/064670 |
| DATED | : June 6, 2023 |
| INVENTOR(S) | : Hatanaka |

It is certified that error appears in the above-identified patent and that said Letters Patent is hereby corrected as shown below:

On the Title Page

Page 2, Item (56) Column 1, Line 15, please change ", ," to -- , --

In the Claims

Column 18, Line 29 (Claim 1, Line 8), please change "atoms" to -- atoms, --

Column 19, Line 1 (Claim 2, Line 1), please change "ethylene-ethylene-vinyl" to -- ethylene-vinyl --

Column 20, Line 10 (Claim 9, Line 1), please change "ethylene-ethylene-vinyl" to -- ethylene-vinyl --

Signed and Sealed this
Twenty-first Day of November, 2023

Katherine Kelly Vidal
*Director of the United States Patent and Trademark Office*